(12) United States Patent
Hueller

(10) Patent No.: US 8,899,011 B2
(45) Date of Patent: Dec. 2, 2014

(54) METHOD AND DEVICE FOR GENERATING ELECTRICITY AND GYPSUM FROM WASTE GASES CONTAINING HYDROGEN SULFIDE

(75) Inventor: Rolf Hueller, Volkach (DE)

(73) Assignee: Knauf Gips KG, Iphofen (DE)

( * ) Notice: Subject to any disclaimer, the term of this patent is extended or adjusted under 35 U.S.C. 154(b) by 0 days.

(21) Appl. No.: 14/009,512

(22) PCT Filed: Jan. 11, 2012

(86) PCT No.: PCT/EP2012/050360
§ 371 (c)(1),
(2), (4) Date: Oct. 2, 2013

(87) PCT Pub. No.: WO2012/146399
PCT Pub. Date: Nov. 1, 2012

(65) Prior Publication Data
US 2014/0020399 A1    Jan. 23, 2014

(30) Foreign Application Priority Data

Apr. 28, 2011   (DE) .......................... 10 2011 002 320

(51) Int. Cl.
*F23G 7/06* (2006.01)
*C01F 11/46* (2006.01)
(Continued)

(52) U.S. Cl.
CPC .............. *F23G 7/065* (2013.01); *C01F 11/464* (2013.01); *F02C 3/22* (2013.01); *F02C 3/30* (2013.01); *F23G 5/50* (2013.01); *B01D 53/343* (2013.01); *B01D 53/52* (2013.01); *F01K 13/006* (2013.01); *F05D 2220/60* (2013.01); *F23G 2209/14* (2013.01); *F23G 2900/55011* (2013.01); *F23J 2215/20* (2013.01); *F23J 2219/40* (2013.01); *F23J 2219/60* (2013.01); *Y02E 20/12* (2013.01); *Y02E 20/14* (2013.01); *B01D 2257/304* (2013.01)
USPC .............. 60/39.5; 60/39.182; 60/39.52; 95/8; 423/244.01; 423/242.1

(58) Field of Classification Search
CPC .............. B01D 53/52; B01D 2257/304; B01D 53/343; F05D 2220/60; F23J 2215/20; F23J 2219/40; F23J 2219/60; F23G 7/065; F23G 2200/14; F23G 2900/55011; C01F 11/464; F02C 3/22; F02C 3/30; F01K 13/006; Y02E 20/12; Y02E 20/14
USPC .............. 60/39.5, 39.182, 39.465, 299, 39.52; 95/8, 235; 423/243.01, 242.1, 243.08, 423/244.01, 555
See application file for complete search history.

(56) References Cited

U.S. PATENT DOCUMENTS 4,039,621 A    8/1977   Costantini
4,302,434 A   11/1981   Hellmer et al.
(Continued)

FOREIGN PATENT DOCUMENTS

CN    102207029 A   10/2011
DE     1 523 655 A1   7/1969
(Continued)

OTHER PUBLICATIONS

International Application No. PCT/EP12/50360 International Preliminary Report on Patentability Dated Mar. 20, 2013 (4 Pages).
(Continued)

*Primary Examiner* — William H Rodriguez
*Assistant Examiner* — Carlos A Rivera
(74) *Attorney, Agent, or Firm* — Keller Jolley Preece

(57) ABSTRACT

Methods of one or more embodiments include delivering hydrogen sulphide-containing exhaust gases to a current generation device where the gases are burnt, preferably with air being supplied. The energy released during combustion is employed at least partially for current generation. One or more embodiments also include an apparatus for current generation in which supplied hydrogen sulphide-containing exhaust gases are burnt, preferably with air being supplied.

15 Claims, 2 Drawing Sheets

(51) Int. Cl.

| | | |
|---|---|---|
| *F02C 3/30* | (2006.01) | |
| *B01D 53/52* | (2006.01) | |
| *F02C 3/22* | (2006.01) | |
| *F23G 5/50* | (2006.01) | |
| *B01D 53/34* | (2006.01) | |
| *F01K 13/00* | (2006.01) | |

(56) References Cited

U.S. PATENT DOCUMENTS

| | | | |
|---|---|---|---|
| 4,406,118 A * | 9/1983 | Funk | 60/39.183 |
| 4,631,915 A * | 12/1986 | Frewer et al. | 60/39.12 |
| 4,723,407 A * | 2/1988 | Goebel et al. | 60/39.12 |
| 4,930,305 A * | 6/1990 | Bell | 60/777 |
| 4,963,513 A | 10/1990 | Marten | |
| 5,253,469 A | 10/1993 | Hodrien et al. | |
| 5,313,781 A | 5/1994 | Toda et al. | |
| 5,690,482 A | 11/1997 | Shessel et al. | |
| 5,798,087 A | 8/1998 | Suda et al. | |
| 5,906,806 A * | 5/1999 | Clark | 423/437.1 |
| 6,919,059 B2 | 7/2005 | Watson et al. | |
| 7,036,461 B2 | 5/2006 | Thielert et al. | |
| 2007/0178035 A1 | 8/2007 | White et al. | |
| 2007/0237696 A1 | 10/2007 | Payton | |
| 2008/0141672 A1* | 6/2008 | Shah et al. | 60/648 |
| 2009/0019853 A1 | 1/2009 | Nilsson | |
| 2009/0100753 A1* | 4/2009 | Schulz et al. | 48/127.5 |
| 2009/0145127 A1* | 6/2009 | Vollmer et al. | 60/618 |
| 2009/0226353 A1 | 9/2009 | Tekie et al. | |
| 2010/0061906 A1 | 3/2010 | Buschmann et al. | |
| 2010/0162678 A1 | 7/2010 | Annigeri et al. | |
| 2010/0187822 A1 | 7/2010 | Bivins | |
| 2010/0230296 A1 | 9/2010 | Northrop | |

FOREIGN PATENT DOCUMENTS

| | | |
|---|---|---|
| DE | 25 24 861 A1 | 12/1976 |
| DE | 28 45 498 A1 | 4/1980 |
| DE | 34 33 088 A1 | 10/1985 |
| DE | 2 510 240 C2 | 3/1986 |
| DE | 692 04 414 T2 | 5/1996 |
| DE | 692 20 829 T2 | 12/1997 |
| DE | 199 39 390 A1 | 2/2001 |
| DE | 696 12 604 T2 | 11/2001 |
| DE | 698 05 716 T2 | 1/2003 |
| DE | 600 00 983 T2 | 9/2003 |
| DE | 600 24 866 T2 | 8/2006 |
| DE | 10 2008 037 502 A1 | 5/2009 |
| EP | 0 290 286 A2 | 11/1988 |
| EP | 0 234 894 B1 | 10/1991 |
| EP | 0 520 317 A1 | 12/1992 |
| EP | 1 456 123 B1 | 9/2004 |
| EP | 2 182 194 A2 | 5/2010 |
| EP | 2246532 A1 * | 11/2010 |
| GB | 349 238 A | 5/1931 |
| GB | 884 627 A | 12/1961 |
| GB | 970 567 A | 9/1964 |
| GB | 1 156 265 A | 6/1969 |
| GB | 1 525 490 A | 9/1978 |
| GB | 1 578 002 A | 10/1980 |
| JP | 7-237921 A | 9/1995 |
| JP | 9-268904 A | 10/1997 |
| RO | 122740 B1 | 12/2009 |
| WO | 97/12118 A1 | 4/1997 |
| WO | 2009/157434 A1 | 12/2009 |
| WO | 2010/060978 A1 | 6/2010 |

OTHER PUBLICATIONS

Dunster, Dr. Andrew M., Flue gas desulphurisation (FGD) gypsum in plasterboard manufacture, BRE, Nov. 2007, 8 pages.

* cited by examiner

METHOD AND DEVICE FOR GENERATING ELECTRICITY AND GYPSUM FROM WASTE GASES CONTAINING HYDROGEN SULFIDE

CROSS-REFERENCE TO RELATED APPLICATIONS

This application is a national phase entry under 35 U.S.C. §371 of International Application No. PCT/EP2012/050360, filed Jan. 1, 2012, which claims the benefit of German Application No. 10 2011 002 320.8, filed Apr. 28, 2011. The entire contents of each of the foregoing patent applications are hereby incorporated by reference.

BACKGROUND OF THE INVENTION

1. Field of the Invention

The invention relates to a method and an apparatus for generating current from hydrogen sulphide-containing exhaust gases, in particular from the natural gas and petroleum industry.

Such a method provides that the hydrogen sulphide-containing exhaust gases are delivered to a current generation device and burned there, preferably with air being supplied, the energy released during combustion being employed at least partially for current generation.

Such an apparatus is provided with a current generation device, in which supplied hydrogen sulphide-containing exhaust gases are burnt, preferably with air being supplied, the energy released during combustion being employed at least partially for current generation.

2. Background and Relevant Art

Exhaust gases, particularly exhaust gases from the natural gas and petroleum industry, are often simply torched off without further utilization, that is to say, when the exhaust gas emerges from a chimney or pipe into the environment, it is burnt without its energy being utilized. The corresponding quantity of carbon dioxide is in this case discharged into the environment.

These exhaust gases contain hydrogen sulphide and therefore present problems for energy utilization, but are basically useful.

BRIEF SUMMARY OF THE INVENTION

The object on which the present invention is based is to specify a method and an apparatus enabling the energy of hydrogen sulphide-containing exhaust gases to be utilized.

This object is achieved in terms of the method by means of the features of Claim 1 and in terms of the apparatus by means of the features of Claim 9. Advantageous refinements and developments are specified in the respectively dependent claims.

The method according to the invention is characterized in that the composition of the hydrogen sulphide-containing exhaust gases is measured before combustion and compared with a stipulated composition or stipulated composition bandwidth. In the event of a deviation from the stipulated composition or composition bandwidth, an additional fraction of natural gas and/or other substances, in particular gases, which is required for correction, is determined and is admixed to the hydrogen sulphide-containing exhaust gases before combustion.

The advantages of the invention are, in particular, that the hydrogen sulphide-containing gases no longer escape, unused, but instead their energy is utilized in that they are employed for current generation.

A further advantage of the invention is that it can be ensured that the composition of the exhaust gases to be burnt is as optimal as possible for the method and, in particular, for the combustion of the exhaust gases which is provided in this case.

Preferably, the combustion temperature of the hydrogen sulphide-containing exhaust gases is at least about 1300° C. The advantage of this is that, at such high combustion temperatures, even harmful attendant substances, such as carbon monoxide and benzene, burn completely to form carbon dioxide and water and therefore occur no longer, or at least to only a markedly reduced extent, in the combustion exhaust gas.

There is provision in a development of the invention for the current generation device to comprise a steam generator which is part of the thermodynamic circuit of a steam power process which, in turn, comprises a steam turbine following the steam generator and a condenser following the steam turbine. The combustion of the hydrogen sulphide-containing exhaust gases takes place in the steam generator. The energy released in this case is employed at least partially for steam generation. Finally, current generation takes place by means of a generator driven by the steam turbine. There may also be provision for the steam to be at least partially branched off and delivered for thermal utilization, for example for heating or warming purposes. In this case, the method according to the invention is a method for generating current and steam from hydrogen sulphide-containing exhaust gases, particularly from the natural gas industry.

Alternatively or additionally, the current generation device may also comprise a gas turbine and/or a gas engine. Current generation in this case takes place by means of a generator driven by the gas turbine and/or by the gas engine.

For example, the stipulated composition or stipulated composition bandwidth of the hydrogen sulphide-containing exhaust gases may provide the following fractions as a molar percentage: hydrogen sulphide: 1% to 10%, in particular 3% to 7%, preferably about 6%, and/or carbon dioxide: 10% to 90%, in particular 60% to 70%, preferably about 65%, and/or nitrogen: 0.0% to 2.0%, in particular 0.2% to 0.6%, preferably about 0.4%, and/or methane: 0.1% to 65%, in particular 12% to 20%, preferably about 16%, and/or ethane: 0.1% to 20%, in particular 2% to 8%, preferably about 5%, and/or hydrocarbons (C4 to C9): 0.01% to 40%, in particular 4% to 10%, preferably about 7%.

There is provision in a development of the invention for the sulphur oxide-containing, in particular sulphur dioxide-containing and sulphur trioxide-containing combustion exhaust gases which occur during the combustion of the hydrogen sulphide-containing exhaust gases to be delivered for flue gas desulphurization. Since the combustion exhaust gases have a very high sulphur oxide fraction (in particular, sulphur dioxide and sulphur trioxide fraction), as compared with customary combustion exhaust gases, it may be expedient to provide multi-stage flue gas desulphurization, preferably multi-stage flue gas desulphurization comprising a solid-bed reactor for sulphur trioxide separation and a lime scrub (wet scrub) for sulphur dioxide separation.

For example, with regard to multi-stage flue gas desulphurization, sulphur trioxide can be separated in a solid-bed reactor in one method stage, preferably in a first method stage. In another method stage, sulphur dioxide can be separated in the wet scrub. Limestone, for example with a 4/6 mm grain size, can be used in the solid-bed reactor. About 80% sulphur trioxide can thereby be separated. Limestone powder, for example with a grain size of 90% below 0.063 mm, can be used for the wet scrub. About 99% sulphur dioxide can thereby be separated.

By means of multi-stage flue gas desulphurization of this type, for example, 20 000 to 50 000 mg/m³ of sulphur dioxide and 600 to 1500 mg/m³ of sulphur trioxide can be separated from the combustion exhaust gases.

A substantial advantage of this multi-stage flue gas desulphurization is the separation of sulphur trioxide. Sulphur trioxide would pass, unchanged, through a straightforward wet scrub, that is to say, without the solid-bed reactor in one of the method stages, the sulphur trioxide would reach the chimney and form an aerosol mist at the chimney outlet. The fraction of sulphur trioxide is very high precisely in the combustion, provided according to the invention, of hydrogen sulphide-containing exhaust gases, particularly from the natural gas and petroleum industry, and multi-stage flue gas desulphurization with a solid-bed reactor for separating sulphur trioxide assumes correspondingly serious importance here.

The gypsum occurring during flue gas desulphurization is delivered to a gypsum mill for the production of gypsum products, for example gypsum plasterboards and/or ready-prepared gypsum mixtures. The method according to the invention is then a method for generating current and gypsum from hydrogen sulphide-containing exhaust gases, particularly from the natural gas and petroleum industry.

The abovementioned gypsum mill can satisfy its demand for electrical energy completely or partially from current generation as a result of the combustion of hydrogen sulphide-containing exhaust gases. There may also be provision for the gypsum mill to derive its heat demand completely or partially from the combustion gases occurring during the combustion of the hydrogen sulphide-containing exhaust gases and/or from the current generation processes, in particular the thermodynamic circuit of the steam power process. If there is provision for deriving the heat demand completely or partially from the steam power process, this may take place in that steam is branched off and is delivered directly to the gypsum mill for heating or warming purposes. For example, the steam may be employed for warming the drying and/or calcining devices for the gypsum mill. If the steam is also utilized thermally, the method according to the invention is a method for generating current, gypsum and steam from hydrogen sulphide-containing exhaust gases, particularly from the natural gas and petroleum industry. A substantial advantage in this case is that a discharge of carbon dioxide from the gypsum mill into the environment can thus be avoided.

The apparatus according to the invention is characterized in that a measuring device for determining the composition of the hydrogen sulphide-containing exhaust gases before combustion is provided, an evaluation device for comparing the composition determined with a stipulated composition or with a stipulated composition bandwidth is provided, and a control device and a supply device for natural gas and/or other substances, in particular gases, are provided, the control device determining, in the event of a deviation, determined by the evaluation device, from the stipulated composition or composition bandwidth, an additional fraction of natural gas and/or other substances, in particular gases, which is required for correction and admixing it to the hydrogen sulphide-containing exhaust gases via the supply device before combustion.

This apparatus is preferably operated by means of the above-described method according to the invention.

The advantages of the apparatus according to the invention are in turn, in particular, that the hydrogen sulphide-containing gases no longer escape, unused, but instead their energy is utilized in that they are employed for current generation.

A further advantage of the apparatus according to the invention is that it can be ensured that the composition of the exhaust gases to be burnt is as optimal as possible for the apparatus and, in particular, for the combustion of the exhaust gases which is provided in it.

Preferably, the combustion temperature of the hydrogen sulphide-containing exhaust gases is at least about 1300° C., as in the method according to the invention.

There is provision in a development of the apparatus for the current generation device to comprise a steam generator which is part of the thermodynamic circuit of a steam power process, which, in turn, comprises a steam turbine following the steam generator and a condenser following the steam turbine. The combustion of the hydrogen sulphide-containing exhaust gases takes place in the steam generator, and the energy released is employed at least partially for steam generation. Furthermore, a generator driven by the steam turbine is provided for current generation. In the apparatus, there may also be provision for the steam to be at least partially branched off and delivered for thermal utilization, for example for heating or warming purposes. In this case, the apparatus according to the invention is an apparatus for generating current and steam from hydrogen sulphide-containing exhaust gases, particularly from the natural gas and petroleum industry.

Alternatively or additionally, the current generation device may comprise a gas turbine and/or a gas engine, a generator driven by the gas turbine and/or by the gas engine being provided for current generation.

For example, the stipulated composition or stipulated composition bandwidth of the hydrogen sulphide-containing exhaust gases may provide the following fractions as molar percentages: hydrogen sulphide: 1% to 10%, in particular 3% to 7%, preferably about 6%, and/or carbon dioxide: 10% to 90%, in particular 60% to 70%, preferably about 65%, and/or nitrogen: 0.0% to 2.0%, in particular 0.2% to 0.6%, preferably about 0.4%, and/or methane: 0.1% to 65%, in particular 12% to 20%, preferably about 16%, and/or ethane: 0.1% to 20%, in particular 2% to 8%, preferably about 5%, and/or hydrocarbons (C4 to C9): 0.01% to 40%, in particular 4% to 10%, preferably about 7%.

There is provision in a development for the apparatus to comprise flue gas desulphurization which purifies sulphur oxide-containing, in particular sulphur dioxide-containing and sulphur trioxide-containing combustion gases occurring during the combustion of the hydrogen sulphide-containing exhaust gases, gypsum being obtained. Since the combustion exhaust gases have a very high sulphur oxide fraction (in particular, sulphur dioxide and sulphur trioxide fraction), as compared with customary combustion exhaust gases, it may be expedient to provide multi-stage flue gas desulphurization, preferably multi-stage flue gas desulphurization comprising a solid-bed reactor for sulphur trioxide separation and a lime scrub for sulphur dioxide separation.

Reference may be made, for further explanations and advantages regarding multi-stage flue gas desulphurization, to the above statements in connection with the method according to the invention.

Further, the apparatus according to the invention may comprise a gypsum mill which employs the gypsum occurring during flue gas desulphurization for the production of gypsum products, for example in the production of gypsum plasterboards and/or ready-prepared gypsum mixtures. The apparatus according to the invention is then an apparatus for generating current and gypsum from hydrogen sulphide-containing exhaust gases, particularly from the natural gas and petroleum industry.

The abovementioned gypsum mill may be set up in such a way that it satisfies its demand for electrical energy completely or partially from current generation as a result of the combustion of hydrogen sulphide-containing exhaust gases. The gypsum mill may also be set up in such a way that it derives its heat demand completely or partially from the combustion gases occurring during the combustion of the hydrogen sulphide-containing exhaust gases and/or from the current generation processes, in particular the thermodynamic circuit of the steam power process. If there is provision for deriving the heat demand completely or partially from the steam power process, this may take place in that steam is delivered directly, via a branch-off, to the gypsum mill for heating or warming purposes. For example, the steam may be employed for warming the drying and/or calcining devices of the gypsum mill. If the steam is also utilized thermally, the apparatus according to the invention is an apparatus for generating current, gypsum and steam from hydrogen sulphide-containing exhaust gases, particularly from the natural gas and petroleum industry. A substantial advantage in this case is that a discharge of carbon dioxide from the gypsum mill into the environment can thereby be avoided.

BRIEF DESCRIPTION OF THE DRAWINGS

The invention is also explained in more detail below with regard to further features and advantages by means of the description of exemplary embodiments and with reference to the accompanying diagrammatic drawings in which.

Parts and components corresponding to one another are designated in the figures by the same reference symbols.

DETAILED DESCRIPTION

Figure 1:
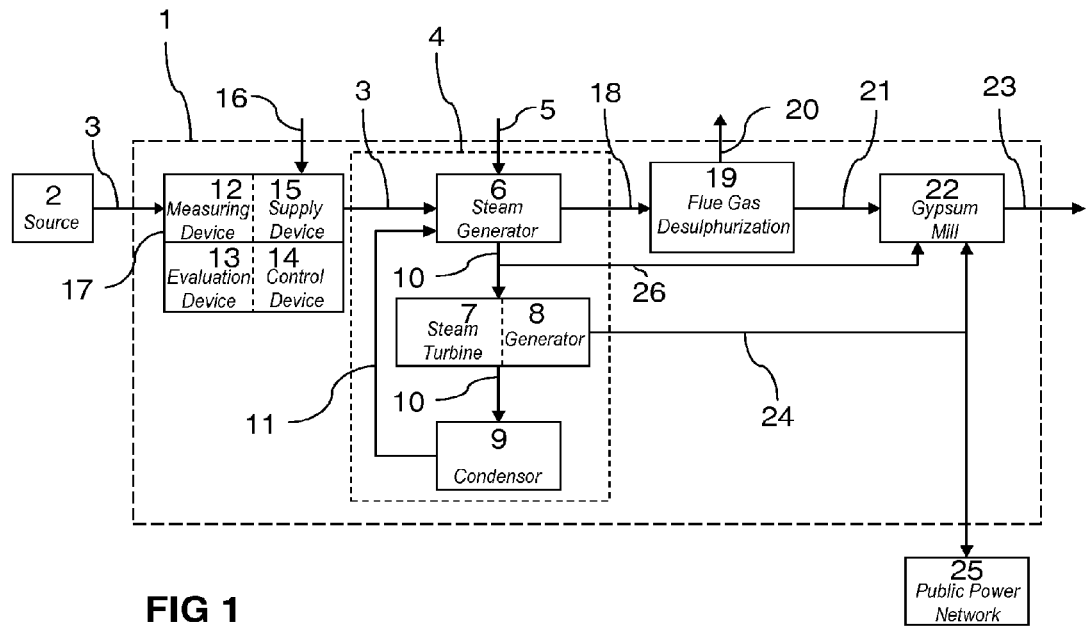
FIG. 1 shows a first exemplary embodiment of the method according to the invention and of the apparatus according to the invention.
Figure 2:
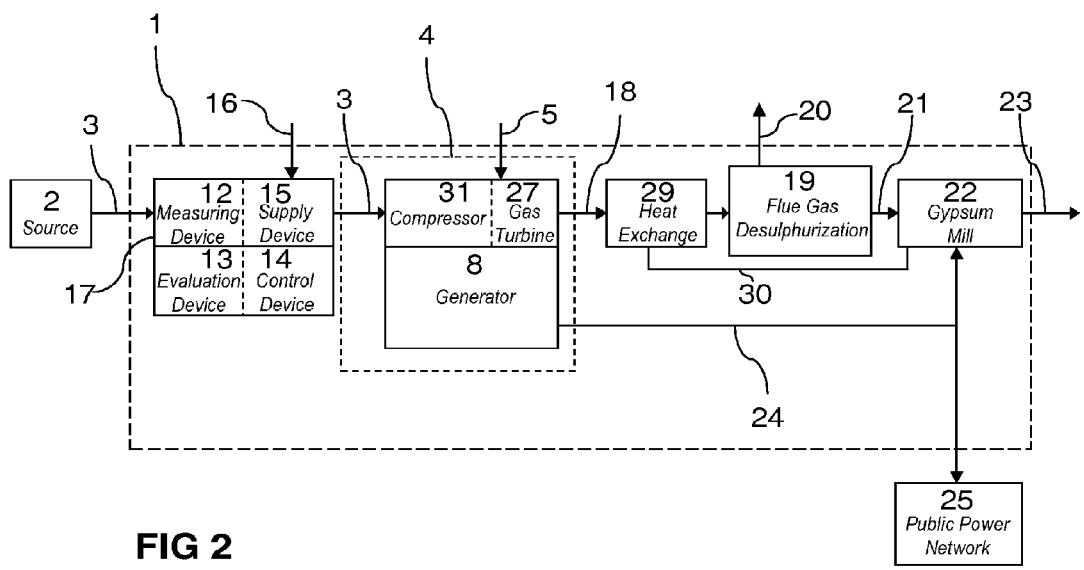
FIG. 2 shows a second exemplary of the method according to the invention and of the apparatus according to the invention.
Figure 3:
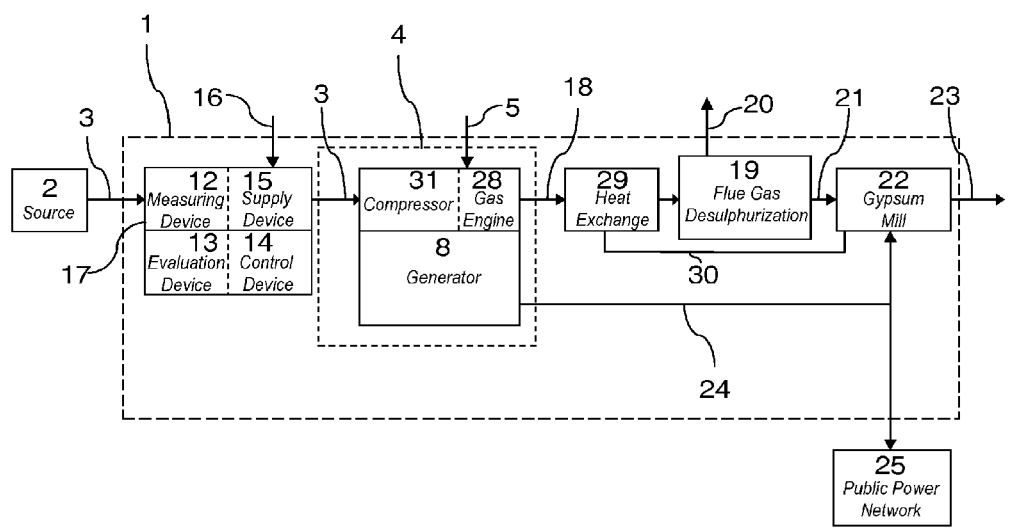
FIG. 3 shows a third exemplary embodiment of the method according to the invention and of the apparatus according to the invention.

FIG. 1 to FIG. 3 show three different exemplary embodiments of the invention. The figures illustrate, by means of the respective exemplary embodiment, both the method 1 according to the invention and the apparatus 1 according to the invention for generating current from hydrogen sulphide-containing exhaust gases 3 from the natural gas and petroleum industry 2. Of course, the method 1 and apparatus 1 can also be employed for hydrogen sulphide-containing exhaust gases 3 from other sources.

In the first exemplary embodiment according to FIG. 1, the incoming hydrogen sulphide-containing exhaust gases 3 are first delivered to an exhaust-gas mixing device 17, the task of which is to provide an exhaust gas 3, the composition of which corresponds to a stipulated composition or lies within a stipulated composition bandwidth. Examples of this stipulated composition or composition bandwidth have already been given above in the general description.

The exhaust-gas mixing device 17 comprises a measuring device 12, by means of which the composition of the incoming hydrogen sulphide-containing exhaust gases 3 is determined. Further, the exhaust-gas mixing device 17 comprises an evaluation device 13 which compares the composition determined with the stipulated composition or with the stipulated composition bandwidth.

Furthermore, the exhaust-gas mixing device 17 comprises a control device 14 and a supply device 15 for natural gas and/or other substances, in particular gases. In the event of a deviation, determined by the evaluation device 13, from the stipulated composition or composition bandwidth, the control device 14 determines an additional fraction of natural gas and/or other substances which is required for correction, and cooperates with the supply device 15 in such a way that the determined fraction of natural gas and/or other substances which is required for correction is admixed as admixing gas 16 to the hydrogen sulphide-containing exhaust gas 3 via the supply device 15 before combustion.

Subsequently, the hydrogen sulphide-containing exhaust gases 3, the composition of which is corrected where appropriate, are delivered to a current generation device 4. The current generation device 4 in the exemplary embodiment according to FIG. 1 comprises a thermodynamic circuit 11 of a steam power process. For this purpose, the current generation device comprises a steam generator 6 to which the exhaust gas 3 is supplied. The hydrogen sulphide-containing exhaust gases 3 are burnt in the steam generator 6, with air 5 being supplied, preferably at a combustion temperature of about 1300° C. The energy released is employed in the steam generator 6 at least partially for steam generation.

The current generation device 4 comprises, furthermore, a steam turbine 7 which follows the steam generator 6. The steam turbine 7 is supplied with the steam 10 generated by the steam generator 6. The steam turbine 7, in turn, is coupled to a generator 8 which is driven by the steam turbine 7 for the generation of current 24. The generated current 24 can be fed into a public power network 25 and/or be made available for electrical consumers.

Further, the current generation device 4 comprises a condenser 9 which follows the steam turbine 7, that is to say, after flowing through the steam turbine 7, the steam 10 is supplied to the condenser 9. This is preferably an air-cooled condenser 9.

After condensation in the condenser 9, the condensed liquid and/or steam still present is supplied again to the steam generator 6, and the thermodynamic circuit 11 of the steam power process is thereby closed.

Alternatively, it is also possible to interrupt the thermodynamic circuit 11 and, on the principle of conventional combined heat and power generation, to utilize the thermal energy still contained in the steam after the latter flows through the steam turbine 7, in other ways, for example for heating purposes within the framework of nearby or distant heating devices. In this case, water has to be supplied to the thermodynamic circuit 11 of the steam power process of the current generation device 4 for compensation upsteam of the steam generator 6, that is to say there is no longer a circulatory process in the actual sense. This alternative is not illustrated in the figures.

During the combustion of the hydrogen sulphide-containing exhaust gases 3 in the steam generator 6, combustion gases 18 arise. These are delivered for flue gas desulphurization 19, purified there and subsequently discharged as purified exhaust gas 20, for example directly into the environment, although this may also be followed or preceded by further exhaust-gas purification steps.

On account of the hydrogen sulphide content of the initial gases, the combustion gases have a very high sulphur dioxide and sulphur trioxide fraction, as compared with combustion exhaust gases from known plants. Correspondingly, flue gas desulphurization 19 suitable for this purpose must be provided, for example multi-stage flue gas desulphurization, preferably multi-stage flue gas desulphurization 19 comprising a solid-bed reactor for sulphur trioxide separation and a lime scrub for sulphur dioxide separation. The water required for flue gas desulphurization can, if the apparatus is located near the sea, be extracted from the sea by means of seawater pumps.

The flue gas desulphurization 19 gives rise to gypsum 21 which is delivered to a gypsum mill 22 for the production of gypsum products 23. For example, gypsum plasterboards or ready-prepared gypsum mixtures are produced in this gypsum mill 22, using the gypsum 21.

The gypsum mill 22 is designed and set up in such a way that it satisfies its demand for electrical energy completely or partially from the current generated by the current generation device 4, that is to say the gypsum mill 22 is one of the abovementioned electrical consumers, for which the current generation device 4 makes available the current 24 generated from the combustion of the hydrogen sulphide-containing exhaust air.

Further, the gypsum mill 22 satisfies its heat demand completely or partially in that it branches off steam 26 from the above-described thermodynamic circuit 11 of the steam power process of the current generation device 4 and extracts heat energy for warming and/or heating purposes from this branched-off steam 26. For example, the branched-off steam 26 can thereby be employed for calcining the gypsum 21 and/or for drying gypsum plasterboards in the gypsum mill 22.

After this thermal utilization, the branched-off steam 26 can be released or used in other ways. In this case, water has to be supplied to the thermodynamic circuit 11 of the steam power process of the current generation device 4 for compensation. Or the branched-off steam 26 is recirculated, after thermal utilization, into the thermodynamic circuit 11 of the steam power processor of the current generation device 4, so that this circuit essentially continues to be closed in terms of the steam. The transfer of the branched-off steam 26 after thermal utilization and the supply, required if appropriate, of water to the thermodynamic circuit 11 are not illustrated in FIG. 1.

The second exemplary embodiment according to FIG. 2 and the third exemplary embodiment according to FIG. 3 correspond in terms of the exhaust-gas supply and exhaust-gas mixing device 17 to the first exemplary embodiment, and therefore reference is made for this purpose to the preceding statements relating to FIG. 1.

However, the second and third embodiments differ from the first exemplary embodiment in the current generation device 4 used. Instead of a steam power process, the current generation device 4 comprises in the second exemplary embodiment a gas turbine 27 and in the third exemplary embodiment a gas engine 28, in each case with a preceding compressor 31 for the exhaust air 3 supplied. The hydrogen sulphide-containing exhaust gases 3, the composition of which is again corrected if appropriate, are delivered to this gas turbine 27 or to this gas engine 28 and are burnt in the gas turbine 27 or gas engine 28, with air 5 being supplied, preferably at a combustion temperature of about 1300° C. The gas turbine 27 or gas engine 28 is coupled to a generator 8 which is driven by the gas turbine 27 or gas engine 28 for the generation of current 24. As in the first exemplary embodiment according to FIG. 1, the generated current 24 can again be fed into a public power network 25 and/or made available for electrical consumers.

During the combustion of the hydrogen sulphide-containing exhaust gases 3 in the gas turbine 27 or gas engine 28, combustion gases 18 arise. These are conducted for further energy utilization through a heat exchanger 29 before being transferred to flue gas desulphurization 19. In the heat exchanger 29, thermal energy is extracted from the combustion gases 18 and delivered via a suitable fluid circuit 30 to a gypsum mill 22, so that this gypsum mill 22 can thereby satisfy its heat demand completely or partially. For example, the heat extracted from the combustion gases 18 can thus be employed for calcining the gypsum 21 and/or for drying gypsum plasterboards in the gypsum mill 22.

All further features of the transfer of the combustion gases 18, of the flue gas desulphurization 19 and of the gypsum mill 22 correspond to the solution already discussed by means of the first exemplary embodiment according to FIG. 1, and therefore reference is made in this regard to the above statements.

To make the advantages of the invention clear, two power output balances of a method 1 or apparatus 1 according to the first exemplary embodiment described above by means of FIG. 1 are given below by way of example.

In both power output balances, the starting-point is hydrogen sulphide-containing exhaust air 3 with a supplied thermal power output of 100 MW(th). The unit MW stands for megawatts. The addition "th" makes it clear that it is a thermal power output, and the addition "el" used below makes it clear that it is an electrical power output.

During operation without a steam branch-off 26 for thermal utilization in the gypsum mill 22, the following power output is afforded:

| | |
|---|---|
| Power network | 21.0 MW(el) |
| Exhaust-gas mixing device | 0.5 MW(el) |
| Steam generator | 0.5 MW(el) |
| Condenser (air-cooled) | 0.5 MW(el) |
| Flue gas desulphurization | 1.5 MW(el) |
| Seawater pumps (for flue gas desulphurization) | 0.5 MW(el) |
| Gypsum mill | 5.5 MW(el) |

During operation with a steam branch-off 26 for thermal utilization in the gypsum mill 22 (steam flow with a pressure of 21 bar, 38 t/h, to a calcining device for gypsum and for gypsum plasterboard drying), the following power output is afforded:

| | |
|---|---|
| Power network | 11.0 MW(el) |
| Exhaust-gas mixing device | 0.5 MW(el) |
| Steam generator | 0.5 MW(el) |
| Condenser (air-cooled) | 0.5 MW(el) |
| Flue gas desulphurization | 1.5 MW(el) |
| Seawater pumps (for flue gas desulphurization) | 0.5 MW(el) |
| Gypsum mill | 5.5 MW(el) |
| Gypsum mill | 24.0 MW(th) |

List of Reference Symbols

1 Method/apparatus for generating current from hydrogen sulphide-containing exhaust gases
2 Natural gas and petroleum industry
3 Hydrogensulphide-containing exhaust gases
4 Current generation device
5 Air
6 Steam generator
7 Steam turbine
8 Generator
9 Condenser
10 Steam
11 Thermodynamic circuit of the steam power process
12 Measuring device 13 Evaluation device
14 Control device
15 Supply device
16 Admixing gas
17 Exhaust-gas mixing device
18 Combustion gases
19 Flue gas desulphurization
20 Purified exhaust gas
21 Gypsum
22 Gypsum mill
23 Gypsum products
24 Current
25 Public power network
26 Branched-off steam for the heat demand of the gypsum mill
27 Gas turbine
28 Gas engine
29 Heat exchanger
30 Fluid circuit
31 Compressor

The invention claimed is:

1. A method for generating current from hydrogen sulphide-containing exhaust gases, particularly from the natural gas and petroleum industry,
the hydrogen sulphide-containing exhaust gases being delivered to a current generation device and being combusted there, with air being supplied, the energy released during combustion being employed at least partially for current generation,
characterized in that
a composition of the hydrogen sulphide-containing exhaust gases is measured before combustion and is compared with a stipulated composition or stipulated composition bandwidth, and, in the event of a deviation from the stipulated composition or composition bandwidth, an additional fraction of one or more gases, which is required for correction, is determined and is admixed to the hydrogen sulphide-containing exhaust gases before combustion;
wherein a sulphur dioxide-containing and sulpher trioxide-containing combustion exhaust gases occurring during the combustion of the hydrogen sulphide-containing exhaust gases are delivered for flue gas desulphurization, the flue gas desulphurization giving rise to gypsum which is delivered to a gypsum mill for the production of gypsum products, in particular gypsum plasterboards and/or ready-prepared a gypsum mixtures.

2. The method according to claim 1,
characterized in that
a combustion temperature of the hydrogen sulphide-containing exhaust gases is at least about 1,300° C.

3. The method according to claim 1,
characterized in that
the current generation device comprises a steam generator which is part of a thermodynamic circuit of a steam power process, which, in turn, comprises a steam turbine following the steam generator and a condenser following the steam turbine, the combustion of the hydrogen sulphide-containing exhaust gases taking place in the steam generator, and the energy released being employed at least partially for steam generation, and current generation being performed by a generator driven by the steam turbine.

4. The method according to claim 3,
characterized in that
the current generation device comprises a gas turbine and/or a gas engine, current generation being performed by a generator driven by the gas turbine and/or by the gas engine.

5. The method according to claim 1,
characterized in that
the stipulated composition or stipulated composition bandwidth of the hydrogen sulphide-containing exhaust gases provides the following fractions as molar percentages:
hydrogen sulphide: 1% to 10%, in particular 3% to 7%, about 6%, and/or
carbon dioxide: 10% to 90%, in particular 60% to 70%, about 65%, and/or
nitrogen: 0.0% to 2,0%, in particular 0,2% to 0.6%, about 0.4%, and/or
methane: 0.1% to 65%, in particular 12% to 20%, about 16%, and/or
ethane: 0,1% to 20%, in particular 2% to 8%, about 5%, and/or
hydrocarbons (C4 to C9): 0,01% to 40%, in particular 4% to 10%, about 7%.

6. The method according to claim 1, wherein the one or more gases comprise natural gas.

7. The method according to claim 6,
characterized in that
the flue gas desulphurization is multi-stage flue gas desulphurization, comprising a solid-bed reactor for sulphur trioxide separation and a lime scrub for sulphur dioxide separation.

8. The method according to claim 6,
characterized in that
the gypsum mill satisfies demand of the gypsum mill for electrical energy completely or partially from current generation as a result of the combustion of the hydrogen sulphide-containing exhaust gases, and/or the gypsum mill derives a heat demand completely or partially from the combustion gases occurring during combustion of the hydrogen sulphide-containing exhaust gases and/or from a current generation processes, in particular the thermodynamic circuit of the steam power process.

9. An Apparatus for generating current from hydrogen sulphide-containing exhaust gases, particularly from the natural gas and petroleum industry, comprising:
a current generation device in which supplied hydrogen sulphide-containing exhaust gases are combusted with air being supplied, the energy released during combustion being employed at least partially for current generation, the current generation device comprising:
a measuring device for determining a composition of the hydrogen sulphide-containing exhaust gases before combustion is provided,
an evaluation device for comparing the composition determined with a stipulated composition or with a stipulated composition bandwidth is provided,
a control device and a supply device for one or more gases, in the event of a deviation, determined by the evaluation device, from the stipulated composition or composition bandwidth, the control device determining an additional fraction of the one or more gases, which is required for correction, and admixing it to the hydrogen sulphide-containing exhaust gases via the supply device before combustion, and
a flue gas desulphurization device which purifies sulphur dioxide-containing and sulphur trioxide-containing combustion gases occurring during the combustion of the hydrogen sulphide-containing exhaust gases, gypsum being obtained, and in that the apparatus comprises a gypsum mill which employs the gypsum occurring during flue gas desulphurization for the production of gypsum products, in particular in the production of gypsum plasterboards and/or ready-prepare gypsum mixtures.

10. The apparatus according to claim 9, characterized in that
a combustion temperature of the hydrogen sulphide-containing exhaust gases is at least about 1,300° C.

11. The apparatus according to claim 9, characterized in that
the current generation device comprises a steam generator which is part of a thermodynamic circuit of a steam power process, which, in turn, comprises a steam turbine following the steam generator and a condenser following the steam turbine, the combustion of the hydrogen sulphide-containing exhaust gases taking place in the steam generator, and the energy released being employed at least partially for steam generation, and a generator driven by the steam turbine being provided for current generation.

12. The apparatus according to claim 11, characterized in that
the current generation device comprises a gas turbine and/or a gas engine, a generator driven by the gas turbine and/or by the gas engine being provided for current generation.

13. The apparatus according to claim 9, characterized in that
the stipulated composition or stipulated composition bandwidth of the hydrogen sulphide-containing exhaust gases provides the following fractions as molar percentages:
hydrogen sulphide: 1% to 10%, in particular 3% to 7%, about 6%, and/or
carbon dioxide: 10% to 90%, in particular 60% to 70%, about 65%, and/or
nitrogen: 0.0% to 2.0%, in particular 0.2% to 0.6%, about 0.4%, and/or
methane: 0.1% to 65%, in particular 12% to 20%, about 16%, and/or
ethane: 0.1% to 20%, in particular 2% to 8%, about 5%, and/or
hydrocarbons (C4 to C9): 0.01% to 40%, in particular 4% to 10%, about 7%.

14. The apparatus according to claim 10, wherein the one or more gases comprise natural gas.

15. The apparatus according to claim 14, characterized in that
the gypsum mill satisfies demand of the gypsum mill for electrical energy completely or partially from current generation as a result of the combustion of the hydrogen sulphide-containing exhaust gases, and/or the gypsum mill derives a heat demand completely or partially from the combustion gases occurring during the combustion of the hydrogen sulphide-containing exhaust gases and/or from a current generation processes, in particular the thermodynamic circuit of the steam power process.

* * * * *